(12) United States Patent
Zayed

(10) Patent No.: US 8,484,116 B2
(45) Date of Patent: Jul. 9, 2013

(54) STRUCTURED FINANCIAL PRODUCTS

(75) Inventor: Nadim Zayed, Clarendon Hills, IL (US)

(73) Assignee: CD Revolution, Inc., Weaton, IL (US)

( * ) Notice: Subject to any disclaimer, the term of this patent is extended or adjusted under 35 U.S.C. 154(b) by 708 days.

(21) Appl. No.: 12/381,197

(22) Filed: Mar. 9, 2009

(65) Prior Publication Data

US 2010/0228686 A1   Sep. 9, 2010

(51) Int. Cl.
*G06Q 40/00* (2012.01)

(52) U.S. Cl.
USPC .......................................... 705/36 T; 705/35

(58) Field of Classification Search
USPC ..................................................... 705/35–45
See application file for complete search history.

(56) References Cited

U.S. PATENT DOCUMENTS

| | | | |
|---|---|---|---|
| 7,149,712 B2 * | 12/2006 | Lang .............................. | 705/35 |
| 2002/0188553 A1 * | 12/2002 | Blauvelt et al. ................. | 705/37 |
| 2006/0080194 A1 * | 4/2006 | Rachie ........................... | 705/35 |
| 2006/0200411 A1 * | 9/2006 | Morgenstern et al. .......... | 705/43 |
| 2007/0033124 A1 * | 2/2007 | Herr et al. ....................... | 705/35 |
| 2007/0174177 A1 * | 7/2007 | Repass ............................ | 705/37 |
| 2009/0030823 A1 * | 1/2009 | Tatro et al. ...................... | 705/35 |
| 2009/0271331 A1 * | 10/2009 | Caruso et al. ............... | 705/36 R |
| 2010/0185467 A1 * | 7/2010 | Strnad, II .......................... | 705/4 |

OTHER PUBLICATIONS

Preliminary 2008 Swiss Reinsurance Company Earnings Conference Call (AM)—Final Anonymous Fair Disclosure Wire pp. n/a Feb. 5, 2009.*

* cited by examiner

*Primary Examiner* — William Rankins
(74) *Attorney, Agent, or Firm* — Paul E Schaafsma; NovusIP, LLC

(57) ABSTRACT

A method of assembling a structured financial instrument, including electronic methods of pricing, selling, and administering the structured financial instrument are provided. A minimum deposit and a specified term are specified. The structured financial instrument is indexed to at least one economic indicator. A percentage of the original deposit may be withdrawn at a specified interval without penalty, with interest calculated at the end of the term reduced to reflect any prior partial withdrawals. The structured financial instrument is insured from the FDIC. In the event of death, a death benefit is provided equal to the value of the structured financial product on the date of death. At a specified time, a structured financial product holder has an option of choosing to lock in a specified percentage of the index gains to date, in exchange for re-upping the structured financial product into a new structured financial product of equal or greater term length and using a similar return framework as the original structured product. In additional embodiments, nursing home liquidity and required minimum distributions liquidity can be provided.

13 Claims, 4 Drawing Sheets

STRUCTURED FINANCIAL PRODUCTS

FIELD OF THE INVENTION

The present invention relates to financial products.

BACKGROUND OF THE INVENTION

Structured financial products are considered by many to be among the fastest growing segments in the financial services industry. Sales of structured products began in the European markets in the 1980's and represent a significant part of the European investment market. These products entered the U.S. market in the 1990's as they gained popularity with institutional investors. Today, the U.S. structured products industry is still in its infancy, but the industry is expanding. In 2007, the market for structured products hit about US$145 B in new sales (from about US$64 B in 2006), eclipsing the market for both convertible securities and closed-end funds, and just behind exchange-traded funds and hedge funds.

The recent growth of structured products can be attributed to a volatile investment climate, better pricing, and increased exposure. The idea behind a structured investment is relatively simple: to create an investment product that provides the opportunity for market-linked returns while mitigating the risk of loss—in other words, upside potential with downside protection. This is accomplished by selecting underlying investments that provide the desired return/risk of loss, which underlying investments typically include futures, swaps, options, and the like. The mix of investments supporting the structured product determines its potential upside, as well as downside protection, tax treatment, time horizon, and other considerations.

Structured investments can be differentiated from other investments as a result of: structured investments have a defined maturity date; many structured investments have principal protection as a feature, something that equities-backed mutual funds do not do; and structured investments can be highly targeted to a specific investor's market view and risk tolerance. Examples of structured products include Principal Protected Notes (PPN) and Principal-Protected Market-Linked CDs ("MLCD"). Both of these products are appealing options to those seeking full protection of their original investment along with the potential for greater returns by linking to an outside financial index, often an equity index. Investors typically give up a portion of any equity appreciation in exchange for the principal protection.

A difference between PPNs and MLCDs is that MLCDs issued by a domestic bank offer principal protection from the Federal Bank Deposit Insurance Corporation (FDIC), 550 17th Street, NW, Washington, D.C. 20429, which protects investors from losses if the bank issuer fails. Recently, the FDIC raised this protection from $100,000 to $250,000 per depositor, per bank, temporarily on non-tax qualified, which matches the permanent protection level on tax qualified investors.

Structured products are typically issued by domestic and foreign banks. Structured products normally are designed for 'buy & hold' investors who want to make a lump sum investment that will mature over time, normally after 3 to 6 years. The pay-out features (i.e., the maturity, underlying index, and pay-out formula) are fixed prior to issuance and are designed to remain unchanged throughout the life of the investment. The processes that are structured into an MLCD can be quite complex. Liquidity with such products also must be taken into consideration by an investor. Because MLCDs generally guarantee a return of principal if held to maturity, MLCDs are not regulated as securities and are not resold on a formally traded market. Liquidating prior to maturity on limited secondary markets can result in losing gains and possibly some principal.

When an investment, such as a MLCD, says it is linked to an equity index, it is referring to the multitude of stock indices that are used to gauge the performance of the economy. These indices track the performance of a specific 'basket' of stocks that represent a particular market or sector of the stock market or the economy. These indices also function as benchmarks against which investors can evaluate the performance of their own portfolios.

Original market indices were invented by nineteenth-century Wall Street Journal editor and Dow Jones & Company co-founder Charles Dow. Dow compiled an index to gauge the performance of the industrial sector of the American stock market, called the Dow Jones Industrial Average. Today, there are numerous market indices that are used to gauge the performance of the U.S. stock market, such as the New York Stock Exchange Composite (NYSE Composite), the Standard & Poor's 500 (S&P500), and the Russell 2000 index. In addition, foreign stock market indices have been developed to track international equity markets, such as the Financial Times Stock Exchange Index (FTSE index), the Deutscher Aktien Index (DAX index), and the Nihon Keizai Shimbun (NIKKEI) index. Specific market sectors are also tracked by equity indices, such as the Biotech Index (BTK) and the Dow Jones Transportation Average (DJTA), to name a few. There are indices that track almost every conceivable sector of the economy and stock market.

The indexes attempt to track the performance of different specific segments of the economy, and some try to provide an overall view of broad segments. In the U.S., the most commonly used include the Dow Jones Industrial Average, the New York Stock Exchange Composite Index, the Standard and Poor's 500 Composite Stock Price Index, the Nasdaq Composite, and the Wilshire 5000. The Dow Jones Industrial Average (DJIA), Dow Jones, & Co., 1 World Financial Center, 200 Liberty Street New York, N.Y. 10281, consists of 30 of the largest and most widely held public companies in the U.S. and is one of the most widely quoted of all the market indicators. The DJIA includes significant companies with a history of successful growth and wide investor interest. The DJIA includes a wide range of companies, from financial services companies to computer companies to retail companies, but does not include any transportation or utility companies. These 30 stocks represent about a fifth of the approximately $8 trillion-plus market value of all U.S. stocks and about a fourth of the value of stocks listed on the New York Stock Exchange.

Because the Dow Jones Industrial Average index only contains 30 companies, some believe this index is outdated and does not truly represent the overall market. Many practitioners prefer to use the Standard and Poor's 500 Composite Stock Price Index or the Wilshire 5000 as market benchmarks. The Standard and Poor's 500 Composite Stock Price Index (S&P 500), Standard & Poor's, 55 Water Street New York, N.Y. 10041, first developed in 1923, is probably the most commonly referenced U.S. equity benchmark. The companies included in the S&P 500 tend to be representative of important industries within the U.S. economy and many also are the leaders of their industries. However, the companies included in the S&P 500 are not necessarily the largest companies in their sector: Standard & Poor's removes and replaces companies in the index based upon business trends. When the U.S. Department of Commerce developed its Index of Leading Economic Indicators in 1968 to signal potential turning points in the national economy, it chose the S&P 500 as one of the components. The S&P 500 is used by an estimated 97% of U.S. money managers and pension plan sponsors. Approximately $626 B is indexed to the S&P 500.

Most analysts use the S&P 500 as their preferred benchmark index thanks to its diversified sector coverage, which today contains over 100 unique sectors, as well as its market capitalization weighting (that is, each stock's weight in the index is proportionate to the stock's market capitalization). Because the index is weighted by market capitalization, the largest firms have the greatest impact on the value of the S&P 500; some view the market capitalization weighting as a flaw.

The Wilshire 5000 is considered the 'total market index.' Designed to track the value of the entire stock market, the index was started in 1974 by Wilshire Associates, 1299 Ocean Avenue, Suite 700 Santa Monica, Calif. 90401. Though it is the nation's broadest-based index, and probably the most accurate reflection of the overall market, it is not frequently cited in the financial press as a gauge for the market's return. The reason for this is that it is often considered 'too broad' a definition of the market. Most practitioners prefer to use the S&P 500 as a proxy for the overall market, especially since it encompasses 70% of its market value. The remaining 30% of the market, which consists primarily of small-cap stocks, is generally considered to be represented by the Russell 2000 Index.

The Nasdaq Composite is a broad market index that encompasses about 4,000 issues traded on the national market of the National Association of Securities Dealers Automated Quotations (Nasdaq), One Liberty Plaza, 165 Broadway, New York, N.Y. 10006. The Nasdaq first started in February of 1971 as the world's first electronic stock market. The Nasdaq Composite Index is comprised of virtually every firm that trades on the exchange. Like the S&P 500, the Nasdaq Composite is calculated based on a market capitalization weighting. The top ten stocks in the index account for more than 30% of the Nasdaq Composite's value. Because technology firms account for roughly two-thirds of the index, investors often use the Nasdaq Composite Index as a guide to determine the strength of technology stocks. Because this index also contains many unproven and speculative companies, the Nasdaq Composite Index tends to be more volatile relative to the other major indices.

In 1966, The New York Stock Exchange Composite Index (NYSE) began as a way to track the price movements of all common stocks listed on the New York Stock Exchange, 11 Wall Street, New York, N.Y. 10005. This index is also market capitalization weighted. The index consists of a composite of all common stocks listed on the NYSE. Four NYSE subgroup indexes also exist, namely Industrial, Transportation, Utility, and Finance.

An emerging type of market-linked product available to investors is Fixed Indexed Annuities—also known as Equity-Indexed Annuities (EIA). EIAs made their debut in 1995 and gained popularity due to volatility in the stock and bond markets. Like other annuities (annuity, meaning payments paid over time, possibly after an accumulation period), EIAs are intended to be retirement savings products issued by life insurance companies. EIAs are marketed as providing an equity-indexed return, but with a minimum return floor. In 2007, approximately $25 billion in EIAs were sold. Over the years, approximately $123 billion in EIA assets have been accumulated, with approximately 58 insurance companies currently issuing indexed annuities. Marketed primarily to those reaching retirement age, investors who have purchased annuities view them as a way to provide additional retirement income and as a safety net in case they or their spouse lives beyond their life expectancy. Today, there are many variations on the EIA concept; each has its own unique features and return philosophies, all of which can affect overall performance.

An EIA is a type of deferred annuity that earns returns linked to an equity index, similar to MLCDs. Because an EIA is a fixed annuity, investors may earn an attractive minimum return on their money (e.g., 2% per year), while deferring taxes on gains. EIAs have not been federally regulated and brokers did not need a securities license to sell EIAs, until a recent Securities and Exchange Commission action, which remains unsettled. EIAs are not FDIC-insured and are subject to the risk of default by the issuing insurance company.

An EIA is a contract between an individual and an insurance company. An investor pays premiums into a policy for the purpose of accumulating savings when they are younger, and then the insurance company pays the savings back, either in a lump sum or in a stream of income at retirement (called annuitiztion), making for a kind of self-funded pension. Premiums can be made in one lump-sum or by paying installments over time. EIAs offer a minimum annual guaranteed interest rate (typically 1%-2%), but also offer market-linked growth potential associated with changes in one or several distinct indices over defined periods, without the risk of directly participating in the underlying market. Interest is calculated using a defined formula based on calculated changes in the index. The terms of the EIA contract dictate how interest is calculated when it is credited. Some EIAs credit interest at the end of the term only, while in other EIAs, a percentage of interest is credited annually or periodically.

Variables that can determine how much interest is credited on an EIA include: participation rate, interest rate return caps, and spread fees. A participation rate determines how much of the associated index's gain will be used to calculate the interest earned. For example, if the participation rate is 90% and the index increases 10%, the interest rate would be 9% (10× 0.9=9) over the applicable period. For a $1,000 investment, a gain of $90 would be seen. Participation rates vary among EIAs, but rates of 70% to 90% are typical.

Some EIAs set a maximum rate of annual interest that the EIA will credit over a specified period. If a contract has an upper annual limit, or cap, of 7% and the index linked to the annuity gained 7.2%, only 7% would be credited to the annuity for that year. Some EIAs have a spread fee instead of, or in addition to, the participation rate. The spread fee is a percentage that is subtracted from the index's gain. For example, if the spread fee is 2% and the index increases 8%, the interest rate credited would be 6% (8−2=6). If there is also a participation rate of 90%, the interest rate credited would be 5.4% ([8−2]×0.9=5.4).

Methods of calculating returns on EIAs include annual reset (or ratchet) method, point-to-point method, and high water mark or look-back method. The annual reset (or ratchet) method compares the index at the beginning of the policy year to the index at the end of the policy year. Interest is added to the value of the annuity at the end of each year. Once credited to the annuity, such interest becomes 'locked-in' because it cannot be taken away due to negative index performance. The beginning index value is reset at the beginning of each new policy year, so future decreases do not affect the interest already earned. Thus, once 'locked-in', this interest will participate in future growth, giving the investor the advantage of compounding in subsequent years. With the annual reset (or ratchet) method, investors are more likely to receive some interest in the event that the EIA is surrendered early; however, investors are also more likely to have a lower participation rate, and/or a participation rate that is changed annually by the insurer.

The point-to-point method compares the value of the index at the beginning of a multi-year term to the value of the index at the end of the term, disregarding fluctuations in-between. With the point-to-point method, interest may not be credited to the annuity until the end of the term. If the EIA is surrendered early, investors may not receive any excess interest for that term.

The high-water mark or look-back method looks at the index at specific points during the term (e.g., each anniversary date). The highest of these is then used as the end-of-term index level and compared with the index value at the beginning of the term. The high-water mark or look-back method could result in a higher interest rate than the point-to-point method if the index has moved downward towards the end of the term. With the high-water mark or look-back method, interest is added to the value of the annuity at the end of the term. As with the other methods, if the EIA is surrendered early, investors may not receive any interest for that term.

Indexed annuities typically do not apply negative changes in an index to the contract value. Thus, if the change in index value is negative over the course of a crediting period, no deduction is taken from contract value nor is any index-based return credited. The new index starting point 'resets' to the new lower level at the end of the 'down year' and the next period's increase, if any, is calculated from that new lower starting point. For ease of understanding, FIG. 1 shows—hypothetically—the basics of how a fixed indexed annuity works in relation to a market index to which it may be linked.

Surrender charges are commonly deducted from withdrawals taken by an investor. The initial surrender charges, which may be as high as 10%-15%, are imposed on surrenders made during the early years of the contract and decline gradually to 0% at the end of a specified surrender charge period, which may be 10 to 15 years. Imposition of a surrender charge may have the effect of reducing or eliminating any index-based return credited to the investor up to the time of withdrawal. A surrender charge also could result in loss of principal, so an investor who surrenders prior to the end of the term may receive less than the original purchase amount.

The best candidates for purchasing EIAs generally have contributed the maximum amount to an employer-sponsored retirement plan (e.g., 401(k) plan) and Individual Retirement Account (IRA) and want additional tax-deferred investments; are conservative investors who are afraid to lose money in the stock market; can keep the annuity long-term; expect to be in a lower income tax bracket at retirement; and desire a guaranteed income in retirement.

EIAs have some of the same features, benefits, and pay-out terms as MLCDs. Benefits of owning a MLCD over an EIA include: MLCDs have a relatively short time commitment, FDIC insurance of principal, smaller minimum contribution requirements, and generally lower fees. With markets dropping precipitously in 2008, "[t]here is a flood of money going into FDIC-insured products," said Matt Ginsburg, head of the customized investment solutions group at Wells Fargo, 420 Montgomery Street, San Francisco, Calif. 94104. (Sophia Morrell, "Structured Products Conference Report" (Oct. 1, 2008)) In a recent presentation on MLCDs, Ginsburg highlighted that "volatility has sparked a stampede to principal-protected products." Investors are choosing to plot a safer course for their investments and as a result there have been massive outflows from mutual funds, which have seen approximately $47 billion leave their management in 2008 alone, according to figures from the Investment Company Institute, 1401 H Street, NW, Washington, D.C., 20005. Howard Dent, who is Marketing Director of Affluent Markets at Wells Fargo, was also feeling bullish about the future of certificates: "In times of stress, people are moving from what they do not know to what they do," he said. "And they know CDs." ("Structured Products Conference Report")

While EIAs can at least be categorized into different groups, such as annual reset or ratchet method, point-to-point method, and high water mark method, MLCDs defy easy categorization. Depending on the bank issuing the MLCD, the terminology from one bank to another can be totally different, and each can have its own subtle nuances that affect return. Some of the characteristics that differentiate MLCDs are that they specify: minimum investment, fixed term, minimum interest to be earned, and principal protection. Minimum investments vary, but are usually around $1,000 with additional investments in $1,000 increments. This relatively low minimum investment level makes these MLCDs enticing to those that would not ordinarily have exposure to this diverse assortment of investments.

MLCDs have a fixed term so investors know when their holding will mature. Typically, these terms vary from 3 to 6 years. Unlike an annuity, a partial withdrawal normally cannot be made from a MLCD. Also, gains will not be realized until the MLCD matures. Whereas an EIA provides a minimum return on the principal, typically approximately 1%-2% annually, MLCDs typically do not provide a minimum return guarantee and will normally have some form of principal protection at maturity. In the worst case scenario, if an investor holds a 3 year MLCD to maturity with a minimum return of 0% and the index falls each of those three consecutive years, the investor would not lose any of the original principal, but would not gain anything either. Some products fix the minimum return at more than 0%.

MLCDs are similar to EIAs in that the return of principal may not be obtained if the investment is sold prior to maturity. In addition, the investor may receive a lower return than a direct investment in the underlying index or security.

There are a wide range of features that are characteristic for most, but not all, structured products. The maturity value of a MLCD, over and above any principal protection, is based on a formula defined at the outset. Like EIAs, MLCDs have several methods of calculating returns; however, the terminology in most cases is different and varies at each issuing bank. MLCDs have 'value dates' which are the 'initial value date' and the 'final value date' specified for the particular offering. Once the value of the index is defined on those predetermined dates, the return is determined using the defined calculation method.

MLCDs, like EIAs, may utilize participation rates. Participation rates can be less than 100% or greater than 100%. MLCDs can have a specified minimum and/or maximum interest amount that may be paid at maturity regardless of the performance of the underlying asset. In an EIA, this maximum amount of interest is referred to as an interest rate cap. If, at maturity, the result of the interest calculation is less than the stated minimum, then the interest amount paid to the investor will be the minimum interest amount. Similarly, if the interest calculation results in a greater value than any stated maximum, then the maximum interest amount would be paid. The minimum interest amount cannot be less than zero; therefore, even if the value of the underlying index decreases, the investor's initial investment must be returned in full at maturity. For example, a JPMorgan/Chase Bank MLCD linked to the S&P 500 has a minimum investment of $1,000 and a 100% participation rate. At maturity, an investor will receive a minimum return of 5% or $50 for each $1,000 MLCD.

By way of another example, the following Table 1 shows how interest would be computed with a 150% participation rate, a minimum interest amount of 10%, and a maximum interest amount of 50% over a range of possible outcomes for the underlying asset:

TABLE 1

| Initial Value of Index | Final Value of Index | % Change | 150% Participation | Interest |
|---|---|---|---|---|
| 100 | 90 | −10% | −15% | 10% |
| 100 | 120 | +20% | +30% | 30% |
| 100 | 150 | +50% | +75% | 50% |

Other types of return definitions also exist. A cliquet plan is a sequence of annual resets (or ratchet) calculation periods, where the index return parameters are fully defined at inception. Under an annual reset or ratchet, the issuer can restate the return parameters each year. A ladder option locks-in positive performance when pre-specified index levels are reached prior to maturity.

Options are at the heart of most structured products and are the underlying asset tool which allows the return to be customized in various ways. Options are flexible, and investors are not limited to making a profit only when an index goes up. Because of the versatility of options, investors also can make money when the index goes down or even sideways. At any one time, investment conditions (e.g. interest rates, index/asset price volatility, etc.) influence what options can be efficiently purchased, and this in turn affects the MLCD structures that can be offered.

Those who typically invest in MLCDs are: seeking equity market participation in a principal protected investment; seeking the deposit insurance the FDIC provides; averse to risk; willing to sacrifice some return for protection; interested in the potential to earn higher returns than a traditional CD; looking for medium-term exposure; and not anticipating the need for finds from their investment before the MLCD matures (a buy and hold investor). MLCDs also may be well suited for qualified retirement accounts such as traditional IRAs or Roth IRAs. These accounts are not considered suitable for customers who depend on interest income for their monthly support. In times of heightened market volatility, investors feel the need to safeguard themselves with downside protection.

Taxable accounts are required to report taxable income each year, even though they may not receive an interest payment until maturity. Such MLCDs are treated as 'contingent payment debt instruments' for U.S. federal income tax purposes and are subject to special tax rules. Under these rules, investors will generally be required to recognize interest income in each year at a calculated yield, even though the issuer does not make any payments with respect to the MLCD until maturity. Tax qualified accounts will not have to pay such taxes until money is withdrawn from these accounts.

The main risks in MLCDs include: lack of liquidity and weak index performance. In the event of death, a holder may redeem a MLCD at par or under some defined amount contained in the terms of the MLCD provisions. MLCDs are not listed on an organized securities exchange. Investors may be unable to sell the MLCD in an organized market prior to maturity, and should an investor sell the MLCD prior to maturity on limited secondary markets, they may receive more or less than the original investment.

In light of current market volatility and record losses in U.S. and international markets, investors are increasingly cautious when investing in an index. Products with principal protection and the backing of FDIC insurance have become a more appealing way to invest. Evidence is already showing that investors are moving in this direction. In November, 2008, Barclays PLC's Barclays Capital, 1 Churchill Place, London, E14 5HP reported "monthly sales of these products are up 30-40% from earlier in the year," according to Philippe El-Asmar, head of investor solutions for Barclays. (Eleanor Laise, "Another 'Safe' Bet Leaves Many Burned" *Wall Street Journal* (Nov. 11, 2008)) As a side benefit, the money invested in MLCDs helps provide liquidity to banks for their lending programs. Thus, investing in bank products with the security of an investment backed by FDIC insurance is a win-win.

Many investors have seen huge paper losses in their investments, with the S&P 500 index declining from 1,497 in September of 2007 to 757 as of 20 Nov. 2008. For investors in principal protected MLCDs and EIAs, account values do not reflect the full downward movement in the index, and their principal has not been affected. Many of these investors will be earning zero, which is more appealing that a 50% drop.

For investors who wish to invest in a MLCD, locating an appropriate MLCD may be a challenge. The first issue they will face is that everyday, banks are issuing hundreds of new offerings. Option prices change on a constant basis. There is no room for hesitation on the part of the buyer. Here lies the second challenge: it takes a great deal of time to wade through and understand all of the details and terms of any given offering. There is no uniformity in how each of these MLCDs is presented. For those not accustomed to the legal language, it can be a challenge; but, it is also a challenge for seasoned brokers as well. "Each works differently. Adding to the confusion is the numerous acronyms companies use for each of their products. Choosing among them is not an easy task. Although many of the instruments appear similar, the distinctions are important and complex and therefore worthy of deeper exploration," said David Krein, President of DTB Capital Group, 95 Worth Street, New York, N.Y. 10013. (David Krein, "Structured Products: Opportunities, Risks, Rewards" *Public Service Review: Transport, Local Government and the Regions* (Issue 9, January 2007)) Due to the complex nature of MLCDs in general, the whole industry has challenges that need to be addressed. "Many people involved in creating and selling structured investments agree that educating investors and representatives about how the instruments work is one of the most important tasks facing the industry." (Michael Iver and Jon Asmundsson, "Winning Converts—Reverse convertibles and other structured investments promise to boost returns and limit risks." *Bloomberg Markets* (November 2007))

Thus, while existing structured products meet the needs of a segment of the investing population, there is a need for a financial product that provides easily understood terms to investors, while allowing for investment flexibility. There is a further need for a financial product that lends itself to simple investment strategies. There is a further need for a financial product that has a strong guaranteed component. There is a further need for a financial product that would be appealing for the conservative investor who wants to share in upward market moves. There is a further need for a financial product that enjoys deposit insurance from the FDIC. There is a further need for a financial product that has uniform features that apply to products issued currently and in the future. There is a further need for a financial product that provides multiple liquidity provisions throughout its term so that investors can access some or all of their money before the product matures.

SUMMARY OF THE INVENTION

A structured financial product in accordance with the principles of the present invention provides easily understood terms to investors, while allowing for investment flexibility. A structured financial product in accordance with the principles of the present invention lends itself to simple investment strategies. A structured financial product in accordance with the principles of the present invention can have a strong guaranteed component. A structured financial product in accordance with the principles of the present invention would be appealing for the conservative investor who wants to share in upward market moves. A structured financial product in accordance with the principles of the present invention enjoys deposit insurance from the FDIC. A structured financial product in accordance with the principles of the present invention has uniform features that apply to products issued currently and in the future. A structured financial product in accordance with the principles of the present invention provides multiple liquidity provisions throughout its term so that investors can access some or all of their money before the product matures.

In accordance with the principles of the present invention, a method of assembling a structured financial instrument, including electronic methods of pricing, selling, and administering the structured financial instrument are provided. A minimum deposit and a specified term are specified. The structured financial instrument is indexed to at least one economic indicator. A percentage of the original deposit may be withdrawn at a specified interval without penalty, with interest calculated at the end of the term reduced to reflect any prior partial withdrawals. The structured financial instrument is insured from the FDIC. In the event of death, a death benefit is provided equal to the value of the structured financial product on the date of death. At a specified time, a structured financial product holder has an option of choosing to lock in a specified percentage of index gains to date, in exchange for re-upping the structured financial product into a new structured financial product of equal or greater term length and using a similar return framework as the original structured product.

DETAILED DESCRIPTION OF A PREFERRED EMBODIMENT

Figure 1:
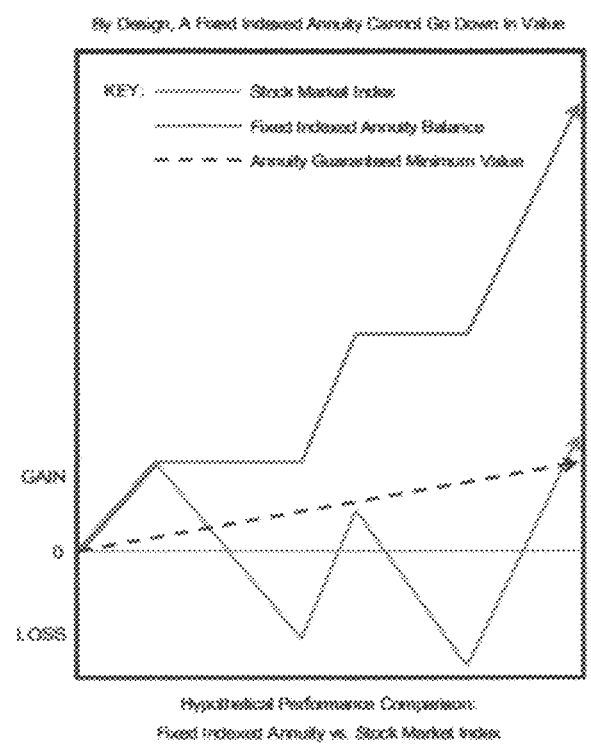
FIG. 1 shows hypothetical basics of how a fixed indexed annuity works in relation to a market index to which it may be linked.

In accordance with the principles of the present invention, structured financial products are provided. In more detail, in accordance with the principles of the present invention, structured financial products are provided having a minimum deposit and a specified term. The structured financial products can be indexed to one or more economic indicators, such as, for example, the New York Stock Exchange Composite (NYSE Composite); the Standard & Poor's 500 (S&P500); the Russell 2000 index; the Financial Times Stock Exchange Index (FTSE index); the Deutscher Aktien Index (DAX index); the Nihon Keizai Shimbun (NIKKEI) index; the Biotech index (BTK), the Dow Jones Transportation Average (DJTA); and the like. Other economic indicators can include, for example, the Consumer Price Index (CPI) promulgated by the U.S. Department of Labor, Bureau of Labor Statistics, Division of Information Services, 2 Massachusetts Avenue, N.E. Room 2860, Washington, D.C. 20212; Gross Domestic Product (GDP) promulgated by the U.S. Department of Commerce, Bureau of Economic Analysis (BEA), 1441 L Street NW, Washington, D.C. 20230; foreign exchange rates; and the like.

For liquidity, a specified percentage of the original deposit may be withdrawn at a specified interval without penalty. Interest calculated at the end of the term will be reduced to reflect any prior partial withdrawals. Upon death, a death benefit will be calculated, equal to the value of the structured financial product on the date of death, calculated as if the date of death was the last day of the structured financial product term. In an additional embodiment, more liquidity (even full liquidity) can be provided to help pay for qualified medical costs associated with a stay at a nursing home. If the customer enters a nursing home and has been there for a give amount of time, such as, for example, 60 or more days, then the structured financial product becomes fully liquid. In an additional embodiment, required minimum distributions (RMDs) for qualified products under the federal income tax code would be allowed penalty-free and would not count against the normal liquidity provision built in to the structured product. And the structured financial product would be eligible for deposit insurance from the FDIC.

At a specified time such as, for example, the halfway point of a structured financial product carrying a longer than 1 year term, the structured financial product holder may choose to lock in a specified percentage of index gains to date, in exchange for re-upping the structured financial product into a new structured financial product of equal or greater term length and using a similar return framework as the original structured product. The deposit for the new structured financial product will be calculated as the original deposit, plus the specified percentage of index gains to the halfway point. The specified percentage will be determined in pricing.

Thus, structured financial products in accordance with the principles of the present invention will be attractive investments due to the simplicity of the structured financial product. In addition, structured financial products in accordance with the principles of the present invention will accommodate a simple laddering strategy by the structured financial product holder. Structured financial products in accordance with the principles of the present invention can have a strong guaranteed component, and also offer a taste of the upside of the index without a cap.

The following are non-limiting examples of structured financial products in accordance with the principles of the present invention.

Example 1

In accordance with the principles of the present invention, a first example structured financial product is provided with a minimum deposit of, for example, $10,000. Terms of, for example, 1, 3, 5, and 10 years can be provided.

The example structured financial product can be indexed to, for example, the S&P 500 index. If the index change is positive at the end of the term (even marginally), then the structured financial product holder is credited with interest of X % of the deposit. If the index change is negative, the structured financial product holder is credited with interest of Y % of the deposit. The levels of X and Y will be determined via pricing, but sample values could be as follows:

TABLE 2

| Term | X | Y |
| --- | --- | --- |
| 1 | 6 | 2 |
| 3 | 25 | 6 |
| 5 | 60 | 10 |
| 10 | 125 | 25 |

For liquidity, for example, 10% of the original deposit (5% in the first year) may be withdrawn penalty-free. The interest calculated at the end of the term will be reduced to reflect any prior partial withdrawals.

The death benefit available in the event of death prior to the end of the term equals the value of the structured financial product on the date of death, calculated as if the date of death was the last day of the structured financial product term.

At the halfway point of a structured financial product carrying the 5 and 10 year terms, the structured financial product holder may choose to lock in a specified percentage of index gains to date, in exchange for re-upping the structured financial product into a new structured financial product of equal or greater term length and using a similar return definition framework as the original structured product. The deposit for the new structured financial product will be calculated as the original deposit, plus the specified percentage of index gains to the halfway point. The specified percentage will be determined in pricing, but the goal would be for the percentage to be at least 50% to 60%. And the structured financial product would be eligible for deposit insurance from the FDIC.

Thus, the simplicity of this 'binary' designed example structured financial product (interest at term-end is known at origination to be one of two numbers, depending upon whether the index increases or decreases) is appealing to the investor. This example structured financial product also lends itself to a simple laddering strategy by the structured financial product holder. A customer could buy a series of 1 year and/or 3 year terms, and roll them over sequentially to smooth out index fluctuations.

Example 2

In accordance with the principles of the present invention, a second example structured financial product is provided with a minimum deposit of, for example, $5,000. Terms of, for example, 1 and 3 years can be provided.

The example structured financial product can be indexed to, for example, the S&P 500 index. Each year, the return is calculated as X %, plus Y % of any positive point-to-point change in the index with no cap. Values of X and Y will be fixed for the term of the structured financial product, although any index-linked credit is available only at the end of the term. Values of X and Y will be determined via pricing, but possible example values are X=2 to 3 and Y=25 to 40. For liquidity, for example, 10% of the original deposit (5% in the first year) may be withdrawn annually and without paying a penalty. The interest calculated at the end of the term will be reduced to reflect any prior partial withdrawals.

The death benefit available in the event of death prior to the end of the term equals the value of the structured financial product on the date of death, calculated as if the date of death was the last day of the structured financial product term.

At the halfway point of a structured financial product carrying the 3 year term, the structured financial product holder may choose to lock in a specified percentage of index gains to date, in exchange for re-upping the structured financial product into a new structured financial product of equal term length and using a similar return definition framework as the original structured product. The deposit for the new structured financial product will be calculated as the original deposit, plus guaranteed declared interest, plus the specified percentage of index gains to the halfway point. The specified percentage will be determined in pricing, but the goal would be for the percentage to be at least 50% to 60%. And the structured financial product would be eligible for deposit insurance from the FDIC.

Thus, this example structured financial product has a strong guaranteed component to it, with an annual interest guarantee, such as, for example, 2-3%. This example structured financial product also offers a taste of the upside of the S&P 500 without a cap. This example structured financial product would be appealing for the conservative investor who values liquidity, and who wants to share somewhat in large upward market moves, but with the assurance of earning at least a minimum amount of interest each year.

Example 3

In accordance with the principles of the present invention, a third example structured financial product is provided with a minimum deposit of, for example, $10,000. Terms of, for example, 1, 3, and 5 years can be provided.

The example structured financial product can be indexed to, for example, the S&P 500 index. Each year, the structured financial product holder is guaranteed to earn interest based on the best performing of three crediting methods, for example:

X % (e.g., 2)
CPI % change for that year
Y % of change in index

The interest is calculated each year, but only credited at the end of the term of the structured financial product. For liquidity, for example, 10% of the original deposit (5% in the first year) may be withdrawn annually and penalty-free. The interest calculated at the end of the term will be reduced to reflect any prior partial withdrawals.

The death benefit equals the value of the structured financial product on the date of death, calculated as if the date of death was the last day of the structured financial product term.

At the halfway point of a structured financial product carrying the 3 and 5 year terms, the structured financial product holder may choose to lock in a specified percentage of CPI/index gains to date, in exchange for re-upping the structured financial product into a new structured financial product of equal or greater term length and using a similar return definition framework as the original structured product. The deposit for the new structured financial product will be calculated as the original deposit, plus the specified percentage of CPI/index gains to the half-way point. The specified percentage will be determined in pricing, but the goal would be for the percentage to be at least 50% to 60%. And the structured financial product would be eligible for deposit insurance from the FDIC.

Thus, this example structured financial product has the benefit of simplicity and should appeal to customers concerned about the effects of inflation. Although depositors are giving up some index upside by having the CPI and declared interest floors, conservative buyers should be willing to make this tradeoff.

In an additional aspect of the present invention, as is known in the art, structured financial products in accordance with the principals of the present invention can be embodied as a system cooperating with computer hardware components, and as a computer-implemented method. For example, in order to make structured financial products of the present invention available to the marketplace, an issuer, such as, for example, a bank must regularly price the offering. In this context, pricing means a determination of how much index participation and how much return guarantee will be provided to the investor. The amount of participation and guarantee will be a function of a number of financial variables, such as, for example, market interest rates (e.g., Treasuries, LIBOR), and implied volatilities. Each of these variables can affect the price of the underlying option supporting the bank's product offer.

Due to the complexity of the above calculations of participation and guarantee level and in accordance with the present invention, computerized financial modeling systems and methods are provided which support the determination of key product parameters. Such modeling systems and methods will not only allow for the input of current financial market conditions, but can also permit the issuer to perform sensitivity analysis on index performance (and resulting customer behavior), and interest rate movements and index volatility. Such modeling flexibility is important in order to assess risks to the issuer of allowing customer choices, such as, for example, the ability to lock-in a percentage of index growth half-way through the term. Further, such modeling systems and methods can allow the issuer to determine whether it is achieving its desired rates of return in offering the structured financial products of the present invention to the public.

Still further, in order to support the sales of structured financial products of the present invention, computerized sales support systems and methods are provided. The computerized sales support systems and methods of the present invention will provide tools that enable a sales representative to illustrate the workings of structured financial products of the present invention to a prospective investor. The computerized sales support systems and methods can educate a potential buyer of a structured financial product of the present invention by showing the returns that would be earned under different hypothetical index return scenarios, as well as under actual historical return scenarios. The computerized sales support systems and methods can compare returns under various types of index return patterns and volatility. Further, the computerized sales support systems and methods can compare the performance of the structured financial product of the present invention to alternative investment choices, which will have potentially different (or no) index linkage and guarantees, as well as different tax treatment. The computerized sales support systems and methods can also illustrate the performance of the structured financial product of the present invention on an inflation-adjusted basis, for example, by comparing the return of the structured financial product of the present invention to that of the Consumer Price Index (CPI).

Computerized financial administration systems and methods will also be able to accommodate customer transactions and periodic reporting after the structured financial product of the present invention has been issued. For example, such systems can calculate withdrawal amounts if requested by the product-holder, and also can adjust the value at maturity of a structured financial product of the present invention in the event of an earlier withdrawal. Further, the computerized financial administration systems and methods can calculate the amount of the death benefit in the event of an account holder's death before maturity. These calculations will often be complex. Finally, the computerized financial administration systems and methods can provide periodic account reports to the account holder on a defined timetable (or upon request).

In addition, once a structured financial product of the present invention is issued to an investor, it is necessary for an issuer to administer the product. In accordance with the present invention, computerized financial administration systems and methods are provided which support structured financial products of the present invention. These systems can, on a product-by-product basis, track index movements, return guarantees, and timing of the application of interest to a given product-holder. The administration systems and methods can maintain records of current account balances, and to the extent needed, can track and report taxable income. Such administration systems and methods can also seamlessly re-up the structured financial product of the present invention in the event an investor chooses to lock in gains halfway through the term, as permitted under some embodiments of the offering.

Case Study Example 1

In accordance with the principles of the present invention, a case study was created by establishing a hypothetical structured financial product for financial analysis in selected past financial periods. In this first case study, the hypothetical structured financial product would have had a purchase date of 1 Jan. 1999 and a deposit of $10,000. Terms of 1, 3, 5, and 10 years were analyzed. The S&P 500 index was utilized. If the index decreases from the beginning to the end of the term, interest credited at the end of the term was established as follows:

TABLE 3

| Term Length (Yrs) | Interest (% of Deposit) |
|---|---|
| 1 | 2 |
| 3 | 6 |
| 5 | 10 |
| 10 | 25 |

If the index increases from the beginning to the end of the term, interest credited at the end of the term was established as follows:

TABLE 4

| Term Length (Yrs) | Interest (% of Deposit) |
|---|---|
| 1 | 6 |
| 3 | 25 |
| 5 | 50 |
| 10 | 125 |

In this first case study, if the term length was 1 year, the account value at end of the term would have been $10,600 ($10,000×1.06), since the index increased from 1229.23 to 1,469.25. If the term length was 3 years, the account value at end of the term would have been $10,600 ($10,000×1.06), since the index decreased from 1,229.23 to 1,148.08. If the term length was 5 years, the account value at end of the term would have been $11,000 ($10,000×1.10), since the index decreased from 1,229.23 to 1,111.92. If the term length was 10 years, the account value at end of the term would have been $12,500 ($10,000×1.25), since the index decreased from 1,229.23 to 903.25.

Figure 2:
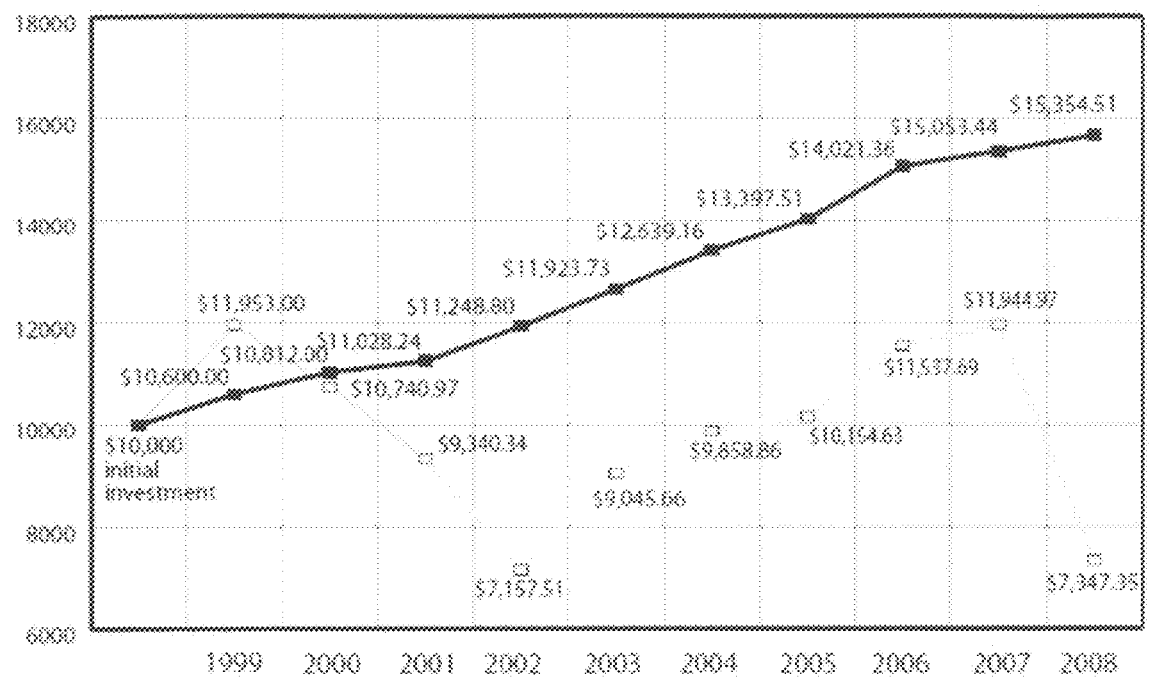
FIG. 2 shows a graphical representation of the performance of an example structured financial product in accordance with the principles of the present invention as compared to the performance of the S&P 500 index.

Referring to FIG. 2, a graphical representation of the growth of the $10,000 invested on Jan. 1, 1999 and renewed for successive 1 year terms for 10 years as set forth in this Case Study Example 1 is seen as compared to the performance of the S&P 500 index, where the darker line represents the present invention and the lighter line represents the S&P 500 index.

Case Study Example 2

In accordance with the principles of the present invention, a second case study was created by establishing a hypothetical structured financial product for financial analysis in selected past financial periods. In this second case study, the hypothetical structured financial product also would have had a purchase date of 1 Jan. 1999 and a deposit of $10,000. Terms of 1 and 3 years were analyzed. The return definition was X %, plus Y % of any positive point-to-point change in the index, with no cap. Again, the S&P 500 index was utilized. Values of X were Y were as follows:

TABLE 4

| Term Length (Yrs) | X | Y |
|---|---|---|
| 1 | 2.0 | 25 |
| 3 | 2.5 | 40 |

In this second case study, if the term length was 1 year, the account value at end of the term would have been $10,688.30 ($10,000×1.06883), since the index increased from 1,229.23 to 1,469.25, which is a 19.53% increase. Twenty-five percent of 19.53% is 4.883%, plus 2%=6.883%.

If the term length was 3 years, the account value at end of the term would have been $11,589.44 ($10,000×1.1031×1.025×1.0250). The return for each of the 3 years was calculated according to the table below:

TABLE 5

| Year | Annual S&P Increase | 40% of S&P Increase | Add 2.5% |
|---|---|---|---|
| 1 | 19.53% | 7.81% | 10.31% |
| 2 | (10.14)% | — | 2.50% |
| 3 | (13.04)% | — | 2.50% |

Figure 3:
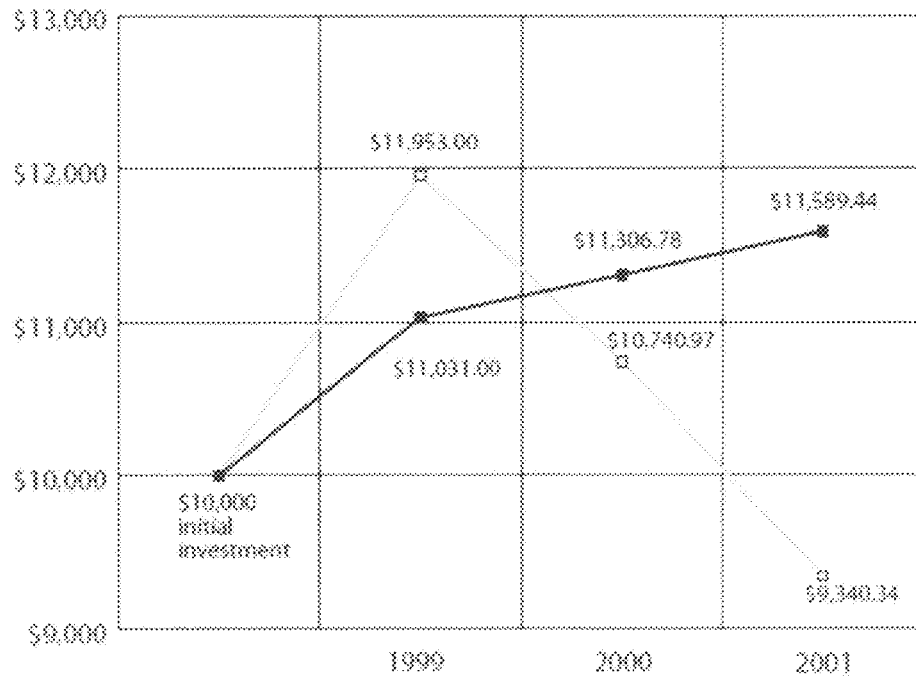
FIG. 3 shows a graphical representation of the performance of another example structured financial product in accordance with the principles of the present invention as compared to the performance of the S&P 500 index.
Figure 4:
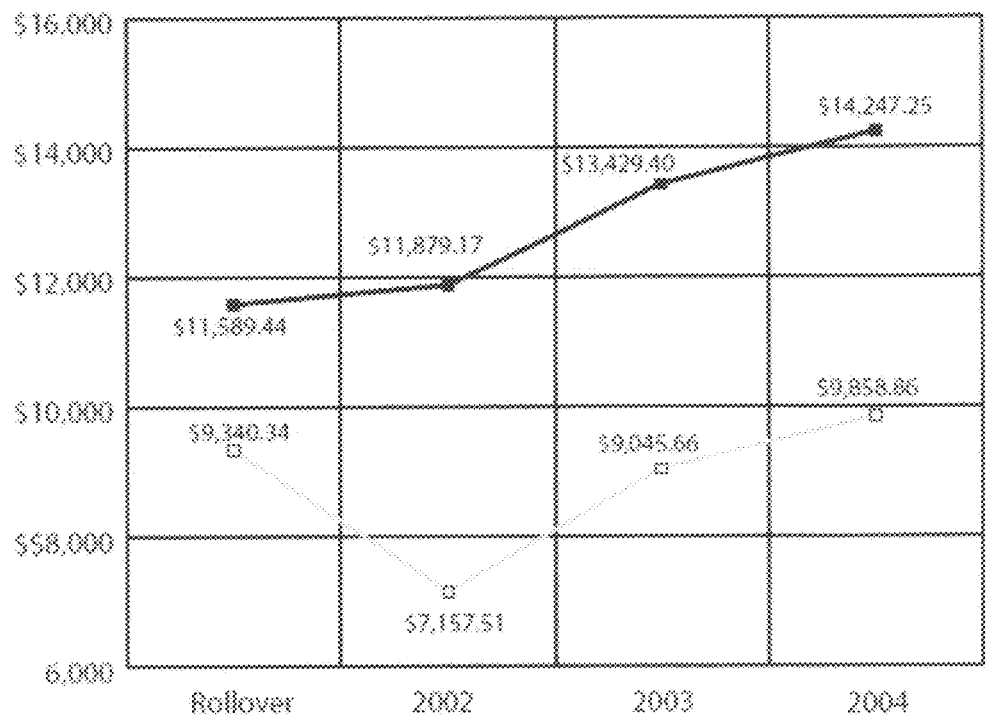
FIG. 4 shows a graphical representation of the performance of the example structured financial product of FIG. 3 for a different time-frame as compared to the performance of the S&P 500 index.
Figure 5:
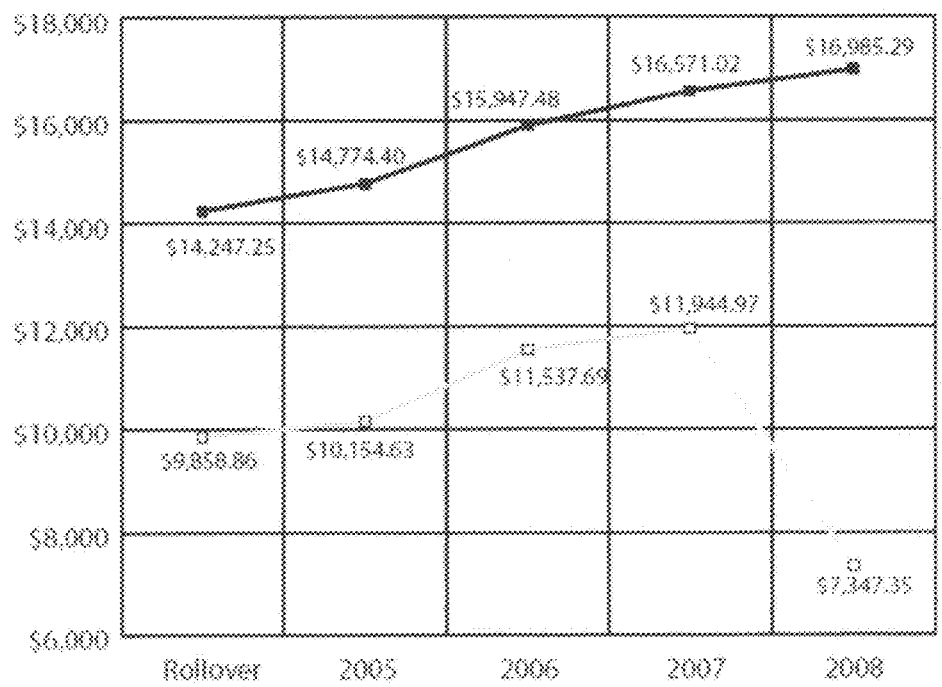
FIG. 5 shows a graphical representation of the performance of the example structured financial product of FIG. 3 for a different time-frame as compared to the performance of the S&P 500 index.

Referring to FIGS. 3-5, a graphical representation of the growth of the $10,000 invested on Jan. 1, 1999 for 3 years as set forth in this Case Study Example 2 is seen in FIG. 3; a graphical representation of the growth of a rollover of the initial investment ($11,589.44-present invention; $9,340.34-S&P500) on Jan. 1, 2002 for three years is seen in FIG. 4; and a graphical representation of the growth of a rollover of the initial investment ($14,247.25-present invention; $9,858.86-S&P500) on Jan. 1, 2005 for three years, with a one year rollover on Jan. 1, 2008, is seen in FIG. 5, all as compared to the performance of the S&P 500 index, where the darker line represents the present invention and the lighter line represents the S&P 500 index.

Case Study Example 3

In accordance with the principles of the present invention, a third case study was created by establishing a hypothetical structured financial product for financial analysis in selected past financial periods. In this third case study, the hypothetical structured financial product also would have had a purchase date of 1 Jan. 1999 and a deposit of $10,000. Terms of 1 and 3 years were analyzed. The return definition varies by length. Each year, the account holder's return is the greatest of:

1% (1 year term), 1.5% (3 year term), or 2% (5 year term);
CPI % change for the year; or
30% of S&P Increase (1 year term), 45% of S&P Increase (3 year term), and 55% of S&P Increase (5 year term).

In this third case study, if the term length was 1 year, the account value at end of the term would have been $10,586.00 ($10,000×1.0586), since the index increased from 1,229.23 to 1,469.25 (19.53%), times 30% (=5.86%), and the CPI change for 1998 was 2.2%.

If the term length was 3 years, the account value at end of the term would have been $11,563.85 ($10,000×1.0879×1.0340×1.0280), based on the table below:

TABLE 6

| Year | Annual S&P Increase | 45% Of S&P Increase | CPI Increase | 1.5% Guarantee | Greatest |
|---|---|---|---|---|---|
| 1 | 19.53% | 8.79% | 2.2% | 1.5% | 8.79% |
| 2 | (10.14)% | — | 3.4% | 1.5% | 3.40% |
| 3 | (13.04)% | — | 2.8% | 1.5% | 2.80% |

If the term length was 5 years, the account value at end of the term would have been $13,748.70 ($10,000×1.1074×1.0340×1.0280×1.0200×1.1451), based on the table below:

TABLE 7

| Year | Annual S&P Increase | 55% Of S&P Increase | CPI Increase | 2.0% Guarantee | Greatest |
|---|---|---|---|---|---|
| 1 | 19.53% | 10.74% | 2.2% | 2.0% | 10.74% |
| 2 | (10.14)% | — | 3.4% | 2.0% | 3.40% |
| 3 | (13.04)% | — | 2.8% | 2.0% | 2.80% |
| 4 | (23.37)% | — | 1.6% | 2.0% | 2.00% |
| 5 | 26.38% | 14.51% | 2.3% | 2.0% | 14.51% |

Figure 6:
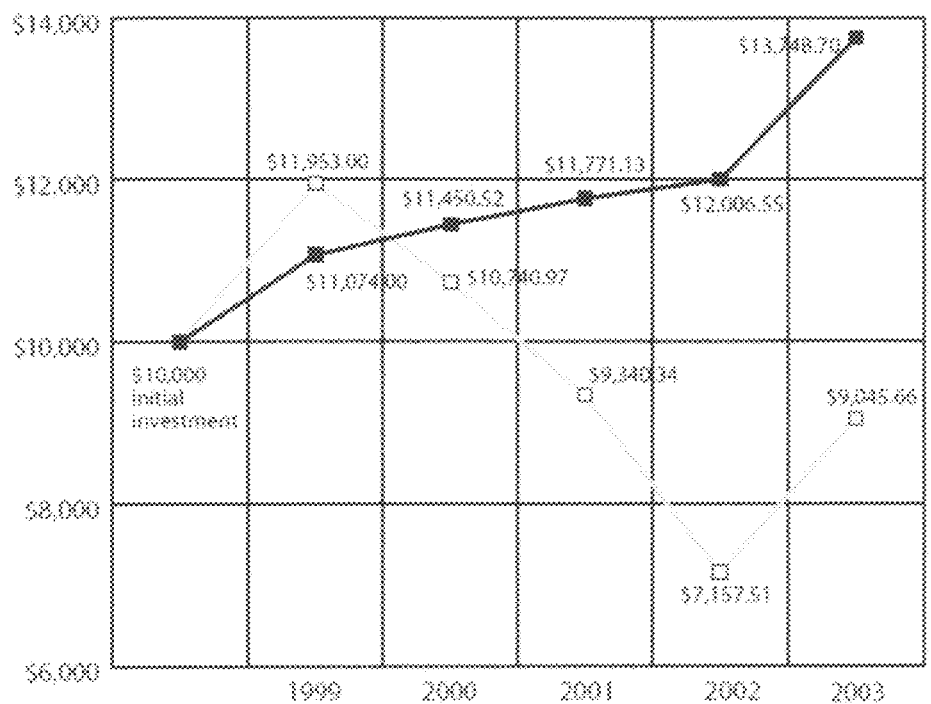
FIG. 6 shows a graphical representation of the performance of another example structured financial product in accordance with the principles of the present invention as compared to the performance of the S&P 500 index.
Figure 7:
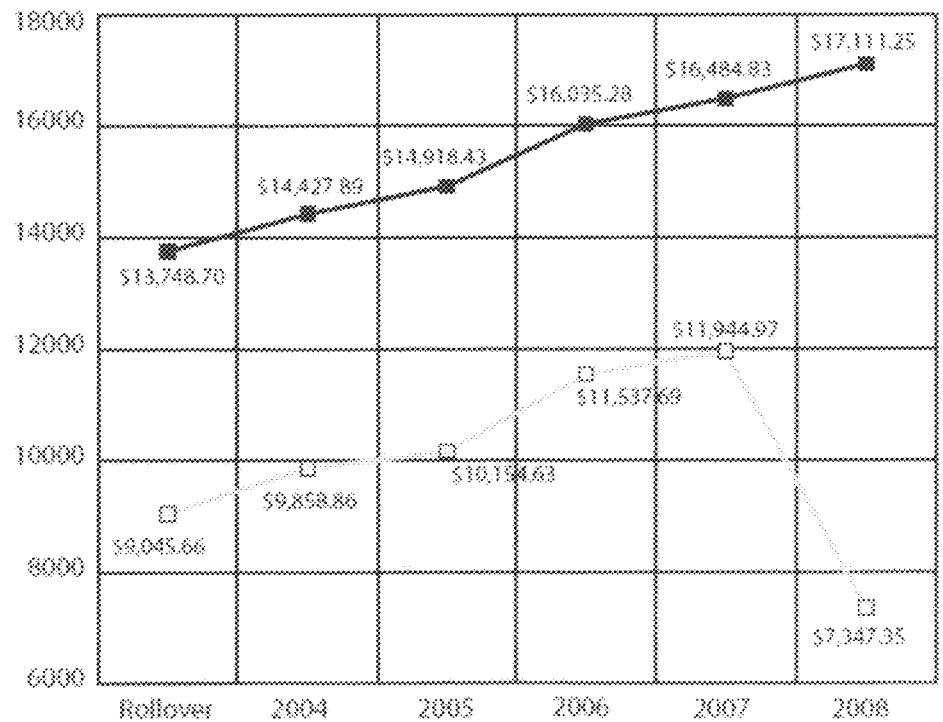
FIG. 7 shows a graphical representation of the performance of the example structured financial product of FIG. 6 for a different time-frame as compared to the performance of the S&P 500 index.

Referring to FIGS. 6 and 7, a graphical representation of the growth of the $10,000 invested on Jan. 1, 1999 for 5 years as set forth in this Case Study Example 3 is seen in FIG. 6; and a graphical representation of the growth of a rollover of the initial investment ($13,748.70-present invention; $9,858.86-

S&P500) on Jan. 1, 2004 for five years is seen in FIG. 7, both as compared to the performance of the S&P 500 index, where the darker line represents the present invention and the lighter line represents the S&P 500 index.

The overall message from these case study examples is that the structured financial products of the present invention perform well in a volatile equities market, by sharing in some of the upside, while limiting the downside in bad years. In the sample calculations, the product parameters for the structured financial products (guaranteed returns, index participation) were chosen to be moderate, supportable parameters in most environments; however, there is no way of knowing what product parameters would have been established for these structured products in January 1999, the selected beginning investment date for these examples. In fact, there is no way of knowing with certainty what the established parameters would have been for most dates in the past. Further, the examples do not reflect use of some of the products other features, such as, for example, nursing home liquidity, RMD liquidity, death benefits, or re-up opportunities.

While the invention has been described with specific embodiments, other alternatives, modifications, and variations will be apparent to those skilled in the art. For example, a further alternative to the third example structured financial product may be one in which the minimum guaranteed interest rate is zero, or the only two components are the CPI and index linkages. Accordingly, it is intended to include all such alternatives, modifications and variations set forth within the spirit and scope of the appended claims.

What is claimed is:

1. A method of electronically assembling a structured financial instrument comprising:
providing, into a memory, a minimum deposit and a specified term;
indexing, by a processor in communication with the memory, to at least one economic indicator;
specifying, into the memory, a percentage of the original deposit that may be withdrawn at a specified interval without penalty, with interest calculated at the end of the term by the processor reduced to reflect any prior partial withdrawals;
insuring the structured financial instrument from the FDIC;
in the event of death, calculating, by the processor, a death benefit equal to the value of the structured financial product on the date of death; and
at a specified time, providing a structured financial product holder with an option of choosing to lock in a specified percentage of the index gains to date, in exchange for re-upping the structured financial product into a new structured financial product of equal or greater term length and using a similar return framework as the original structured product.

2. The method of electronically assembling a structured financial instrument of claim 1 further including calculating, by the processor in communication with the memory, the death benefit calculated as if the date of death was the last day of the structured financial product term.

3. The method of electronically assembling a structured financial instrument of claim 1 further including specifying, into the memory, the specified time as a halfway point of a structured financial product.

4. The method of electronically assembling a structured financial instrument of claim 1 further including providing liquidity to help pay for qualified medical costs associated with a stay at a nursing home.

5. The method of electronically assembling a structured financial instrument of claim 1 wherein required minimum distributions for qualified products under the federal income tax code are penalty-free and do not count against the normal liquidity provision built in to the structured product.

6. The method of electronically assembling a structured financial instrument of claim 1 further including indexing, by the processor in communication with the memory, the structured financial product to an index selected from the group comprising the NYSE Composite; the S&P500; the RUSSELL 2000 index; the NIKKEI index; the FTSE index; the DAX index; the BTK index; the DJIA; and combinations thereof.

7. The method of electronically assembling a structured financial instrument of claim 1 further including indexing, by the processor in communication with the memory, the structured financial product to an index selected from the group comprising the CPI; GDP; foreign exchange rates; and combinations thereof.

8. An electronic method of administering a structured financial instrument comprising:
inputting into a memory a minimum deposit and a specified term;
tracking, on a processor in communication with the memory, at least one economic indicator to which the structured financial instrument is indexed;
determining, on the processor, the performance of the structured financial instrument with respect to a return guarantee;
timing, on the processor, the application of interest to the structured financial instrument;
tracking, on the processor, whether a percentage of the original deposit is to be withdrawn at a specified interval without penalty;
determining, on the processor, whether a percentage of the original deposit has been withdrawn at a specified interval without penalty;
reducing, on the processor, interest at the end of the term to reflect any prior partial withdrawals;
at a specified time, choosing to lock in a specified percentage of the index gains to date and, if so chosen, re-upping the structured financial product into a new structured financial product; and
in the event of death, calculating, on the processor, a death benefit equal to the value of the structured financial product on the date of death.

9. The electronic method of administering a structured financial instrument of claim 8 further including maintaining, on the memory, records of current account balances, and tracking and reporting taxable income.

10. The electronic method of administering a structured financial instrument of claim 8 further including tracking, on the processor, taxable income.

11. The electronic method of administering a structured financial instrument of claim 10 further including reporting taxable income.

12. The electronic method of administering a structured financial instrument of claim 8 further including calculating, on the processor, withdrawal amounts.

13. The electronic method of administering a structured financial instrument of claim 8 further including providing periodic account reports.

* * * * *